United States Patent
Hu et al.

(10) Patent No.: US 9,730,235 B2
(45) Date of Patent: Aug. 8, 2017

(54) ADAPTIVE CHANNEL BANDWIDTH SWITCHING METHOD AND SYSTEM

(71) Applicant: Huawei Technologies Co., Ltd., Shenzhen, Guangdong (CN)

(72) Inventors: Pei Hu, Chengdu (CN); Xinshi Hu, Chengdu (CN); Jixiong Yin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 14/731,001

(22) Filed: Jun. 4, 2015

(65) Prior Publication Data

US 2015/0271833 A1 Sep. 24, 2015

Related U.S. Application Data

(63) Continuation of application No. PCT/CN2012/086178, filed on Dec. 7, 2012.

(51) Int. Cl.
*H04L 12/26* (2006.01)
*H04W 72/08* (2009.01)
(Continued)

(52) U.S. Cl.
CPC ............ *H04W 72/085* (2013.01); *H04L 1/00* (2013.01); *H04L 1/0002* (2013.01); *H04L 1/008* (2013.01); *H04L 1/0025* (2013.01); *H04L 25/03* (2013.01)

(58) Field of Classification Search
USPC ............ 370/229, 230, 230.1, 235, 252, 474
See application file for complete search history.

(56) References Cited

U.S. PATENT DOCUMENTS 4,780,883 A 10/1988 O'Connor et al.
6,728,308 B1 * 4/2004 Chu ...................... H04L 1/0003
375/222

(Continued)

FOREIGN PATENT DOCUMENTS

CN 1224553 A 7/1999
CN 101753203 A 6/2010
(Continued)

*Primary Examiner* — Candal Elpenord
*Assistant Examiner* — Nguyen Ngo

(57) ABSTRACT

An embodiment of the present invention provides an adaptive channel bandwidth switching method, including: buffering service data to be sent; sending a first microwave frame to a receiving end device; performing a receiving configuration after processing the first microwave frame; continuously sending second microwave frames to the receiving end device; switching a configuration related to the symbol rate after receiving the second microwave frames; performing symbol synchronization; performing frame synchronization; performing equalizer convergence; sending a third microwave frame to the receiving end device after the receiving end device performs the equalizer convergence; performing a receiving configuration after processing the third microwave frame; stopping buffering the service data to be sent; and sending a fourth microwave frame to the receiving end device, so as to switch the channel bandwidth. The embodiment of the present invention provides an effective method for improving link availability.

8 Claims, 3 Drawing Sheets

(51) Int. Cl.
*H04L 1/00* (2006.01)
*H04L 25/03* (2006.01)

(56) References Cited

U.S. PATENT DOCUMENTS

| | | | |
|---|---|---|---|
| 2002/0080735 A1* | 6/2002 | Heath | H04L 1/0025 370/328 |
| 2003/0002495 A1* | 1/2003 | Shahar | H04L 1/0003 370/389 |
| 2004/0190510 A1* | 9/2004 | Dickson | H04W 28/06 370/389 |
| 2011/0182175 A1 | 7/2011 | Zhang | |
| 2012/0114022 A1* | 5/2012 | Lever | H04B 7/18515 375/214 |

FOREIGN PATENT DOCUMENTS

| | | |
|---|---|---|
| CN | 101958745 A | 1/2011 |
| CN | 102111360 A | 6/2011 |
| EP | 0 154 565 A2 | 9/1985 |
| EP | 1 873 954 A2 | 1/2008 |
| WO | WO 98/02986 A1 | 1/1998 |
| WO | WO 01/67702 A1 | 9/2001 |

\* cited by examiner

CONT.
FROM
FIG. 1A

The sending end device sends a third microwave frame to the receiving end device according to the symbol rate corresponding to the target channel bandwidth after the receiving end device performs the equalizer convergence, where a frame header of the third microwave frame indicates that a next frame is a normal frame, and that a symbol rate of the next frame is the symbol rate corresponding to the target channel bandwidth, and a payload portion of the third microwave frame carries a random symbol — S106

The receiving end device performs a receiving configuration for the normal frame with a symbol rate of the symbol rate corresponding to the target channel bandwidth after processing the third microwave frame — S107

The sending end device stops buffering the service data to be sent — S108

The sending end device sends a fourth microwave frame to the receiving end device according to the symbol rate corresponding to the target channel bandwidth, where a frame header of the fourth microwave frame indicates that a next frame is a normal frame, and that a symbol rate of the next frame is the symbol rate corresponding to the target channel bandwidth, and a payload portion of the fourth microwave frame carries a service symbol, so as to switch the channel bandwidth — S109

FIG. 1B

ADAPTIVE CHANNEL BANDWIDTH SWITCHING METHOD AND SYSTEM

CROSS-REFERENCE TO RELATED APPLICATIONS

This application is a continuation of International Application No. PCT/CN2012/086178, filed on Dec. 7, 2012, which is hereby incorporated by reference in its entirety.

TECHNICAL FIELD

The present invention belongs to the field of microwave, and in particular, to an adaptive channel bandwidth switching method and system.

BACKGROUND

For a microwave transmission system, link availability is an important indicator for measuring link quality. The availability refers to a ratio of remaining available time except unavailable time to total working time of a device. In practical application, the link availability may be affected by factors such as weather variations and external signal interference.

QAM (Quadrature Amplitude Modulation, quadrature amplitude modulation) is a modulation scheme used by current mainstream microwave devices. Usually, the number of signal vector endpoints in a signal vector endpoint distribution map is used to define different modulation modes, for example, 16 QAM, 32 QAM, and 64 QAM. The larger the number, the higher the sensitivity will be, the larger a link transmission capacity will be, and the lower an anti-interference capability will be. For example, in a same channel bandwidth, in contrast to the 32 QAM modulation mode, the 64 QAM modulation mode has a higher sensitivity, a larger link transmission capacity, and a lower anti-interference capacity. For ease of description, in the specification, the modulation mode with a large number of signal vector endpoints is referred to as a high modulation mode and otherwise referred to as a low modulation mode.

In the current microwave system, ACM (Adaptive Coding and Modulation, adaptive coding and modulation mode) is a common method for improving the link availability. When microwave link signal quality deteriorates, the ACM function lowers the sensitivity of the microwave system by lowering a transmission modulation mode, to improve the link availability. When the microwave link signal quality recovers, the ACM function upgrades the transmission modulation mode again to increase the link transmission capacity.

In the prior art, in addition to the ACM, there are no other effective methods for improving the link availability. Further, the ACM technology cannot effectively improve the link availability in the situation where the modulation mode is already the lowest modulation mode, so that transmission of a high-priority service cannot be ensured.

SUMMARY

In view of the foregoing problems, embodiments of the present invention provide an adaptive channel bandwidth switching method and system, aiming at solving the technical problems in the prior art that in addition to the ACM, there are no other effective methods for improving the link availability, and that the ACM technology cannot effectively improve the link availability in the situation where the modulation mode is already the lowest modulation mode, so that transmission of a high-priority service cannot be ensured.

In a first aspect, the adaptive channel bandwidth switching method includes: buffering, by a sending end device, service data to be sent; sending, by the sending end device, a first microwave frame to a receiving end device according to a symbol rate corresponding to an initial channel bandwidth, where a frame header of the first microwave frame indicates that a next frame is a transition frame, and that a symbol rate of the next frame is a symbol rate corresponding to a target channel bandwidth, and a payload portion of the first microwave frame carries a random symbol; performing, by the receiving end device, a receiving configuration for the transition frame with a symbol rate of the symbol rate corresponding to the target channel bandwidth after processing the first microwave frame; continuously sending, by the sending end device, second microwave frames to the receiving end device according to the symbol rate corresponding to the target channel bandwidth, where a frame header of the second microwave frame indicates that a next frame is a transition frame, and that a symbol rate of the next frame is the symbol rate corresponding to the target channel bandwidth, and a payload portion of the second microwave frame carries a random symbol; switching, by the receiving end device, a configuration related to the symbol rate after receiving the second microwave frames; performing, by the receiving end device, symbol synchronization; performing, by the receiving end device, frame synchronization; performing, by the receiving end device, equalizer convergence; sending, by the sending end device, a third microwave frame to the receiving end device according to the symbol rate corresponding to the target channel bandwidth after the receiving end device performs the equalizer convergence, a frame header of the third microwave frame indicates that a next frame is a normal frame, and that a symbol rate of the next frame is the symbol rate corresponding to the target channel bandwidth, and a payload portion of the third microwave frame carries a random symbol; performing, by the receiving end device, a receiving configuration for the normal frame with a symbol rate of the symbol rate corresponding to the target channel bandwidth after processing the third microwave frame; stop buffering, by the sending end device, the service data to be sent; and sending, by the sending end device, a fourth microwave frame to the receiving end device according to the symbol rate corresponding to the target channel bandwidth, where a frame header of the fourth microwave frame indicates that a next frame is a normal frame, and that a symbol rate of the next frame is a symbol rate corresponding to the target channel bandwidth, and a payload portion of the fourth microwave frame carries a service symbol, so as to switch the channel bandwidth.

In a first possible implementation of the first aspect, before the buffering, by the sending end device, service data to be sent, the method further includes: sending, by the sending end device, a fifth microwave frame to the receiving end device according to the symbol rate corresponding to the initial channel bandwidth, where a frame header of the fifth microwave frame indicates that a next frame is a transition frame, and that a symbol rate of the next frame is the symbol rate corresponding to the initial channel bandwidth, and a payload portion of the fifth microwave frame carries a service symbol; and performing, by the receiving end device, a receiving configuration for the transition frame with a symbol rate of the symbol rate corresponding to the initial channel bandwidth after processing the fifth microwave frame.

With reference to the first possible implementation of the first aspect, in a second possible implementation, before the sending, by the sending end device, a fifth microwave frame, the method further includes: receiving, by an intermediate frequency module of the sending end device, signal quality information from the receiving end device, and forwarding the signal quality information to a service multiplexing module of the sending end device; sending, by the service multiplexing module of the sending end device, the signal quality information to an adaptive modulation mode and channel bandwidth sending module of the sending end device; and judging according to the signal quality information, by the adaptive modulation mode and channel bandwidth sending module of the sending end device, whether it is necessary to perform channel bandwidth switching, and if yes, sending a switching request to the service multiplexing module of the sending end device.

With reference to the second possible implementation of the first aspect, in a third possible implementation, before the receiving, by the intermediate frequency module of the sending end device, the signal quality information from the receiving end device, the method further includes: feeding back, by an intermediate frequency module of the receiving end device, the signal quality information to an adaptive modulation mode and channel bandwidth receiving module of the receiving end device; and instructing, by the adaptive modulation mode and channel bandwidth receiving module of the receiving end device, a service multiplexing module of the receiving end device to send the signal quality information to the sending end device.

In a fourth possible implementation of the first aspect, the sending, by the sending end device, a third microwave frame to the receiving end device according to the symbol rate corresponding to the target channel bandwidth after the receiving end device performs the equalizer convergence specifically includes: sending, by the sending end device, a third microwave frame to the receiving end device according to the symbol rate corresponding to the target channel bandwidth after the number of the sent second microwave frames reaches a preset value; or, setting, by the sending end device, a timer, and sending a third microwave frame to the receiving end device according to the symbol rate corresponding to the target channel bandwidth when the timer expires.

In a second aspect, the adaptive channel bandwidth switching system includes a sending end device and a receiving end device, where the sending end device is configured to buffer service data to be sent; send a first microwave frame to a receiving end device according to a symbol rate corresponding to an initial channel bandwidth, where a frame header of the first microwave frame indicates that a next frame is a transition frame, and that a symbol rate of the next frame is a symbol rate corresponding to a target channel bandwidth, and a payload portion of the first microwave frame carries a random symbol; continuously send second microwave frames to the receiving end device according to the symbol rate corresponding to the target channel bandwidth, where a frame header of the second microwave frame indicates that a next frame is a transition frame, and that a symbol rate of the next frame is the symbol rate corresponding to the target channel bandwidth, and a payload portion of the second microwave frame carries a random symbol; send a third microwave frame to the receiving end device according to the symbol rate corresponding to the target channel bandwidth after the receiving end device performs equalizer convergence, where a frame header of the third microwave frame indicates that a next frame is a normal frame, and that a symbol rate of the next frame is the symbol rate corresponding to the target channel bandwidth, and a payload portion of the third microwave frame carries a random symbol; stop buffer the service data to be sent; and send a fourth microwave frame to the receiving end device according to the symbol rate corresponding to the target channel bandwidth, where a frame header of the fourth microwave frame indicates that a next frame is a normal frame, and that a symbol rate of the next frame is the symbol rate corresponding to the target channel bandwidth, and a payload portion of the fourth microwave frame carries a service symbol; and the receiving end device is configured to perform a receiving configuration for the transition frame with a symbol rate of the symbol rate corresponding to the target channel bandwidth after processing the first microwave frame; switch a configuration related to the symbol rate after receiving the second microwave frames, perform symbol synchronization, perform frame synchronization, and perform equalizer convergence; and perform a receiving configuration for the normal frame with a symbol rate of the symbol rate corresponding to the target channel bandwidth after the third microwave frame is processed.

In a first possible implementation of the second aspect, the sending end device is further configured to, before the service data to be sent is buffered, send a fifth microwave frame to the receiving end device according to the symbol rate corresponding to the initial channel bandwidth, where a frame header of the fifth microwave frame indicates that a next frame is a transition frame, and that a symbol rate of the next frame is the symbol rate corresponding to the initial channel bandwidth, and a payload portion of the fifth microwave frame carries a service symbol; and the receiving end device is further configured to perform a receiving configuration for the transition frame with a symbol rate of the symbol rate corresponding to the initial channel bandwidth after processing the fifth microwave frame.

With reference to the first possible implementation of the second aspect, in a second possible implementation, the sending end device is further configured to, before the fifth microwave frame is sent, receive signal quality information from the receiving end device, and judge according to the signal quality information whether it is necessary to perform channel bandwidth switching.

In the embodiment of the present invention, the sending end device buffers the service data to be sent; the sending end device sends a first microwave frame to the receiving end device according to the symbol rate corresponding to the initial channel bandwidth, where the frame header of the first microwave frame indicates that the next frame is a transition frame, and that the symbol rate of the next frame is the symbol rate corresponding to the target channel bandwidth, and the payload portion of the first microwave frame carries a random symbol; the receiving end device performs a receiving configuration for the transition frame with a symbol rate of the symbol rate corresponding to the target channel bandwidth after processing the first microwave frame; the sending end device continuously sends second microwave frames to the receiving end device according to the symbol rate corresponding to the target channel bandwidth, where the frame header of the second microwave frame indicates that the next frame is a transition frame, and that the symbol rate of the next frame is the symbol rate corresponding to the target channel bandwidth, and a payload portion of the second microwave frame carries a random symbol; the receiving end device switches a configuration related to the symbol rate after receiving the second microwave frames; the receiving end device performs frame synchronization; and the receiving end device performs equalizer convergence; the sending end device sends a third microwave frame to the receiving end device according to the symbol rate corresponding to the target channel bandwidth after the receiving end device performs the equalizer convergence, where the frame header of the third microwave frame indicates that the next frame is a normal frame, and that the symbol rate of the next frame is the symbol rate corresponding to the target channel bandwidth, and the payload portion of the third microwave frame carries a random symbol; the receiving end device performs a receiving configuration for the normal frame with a symbol rate of the symbol rate corresponding to the target channel bandwidth after processing the third microwave frame; the sending end device stops buffering the service data to be sent; and the sending end device sends a fourth microwave frame to the receiving end device according to the symbol rate corresponding to the target channel bandwidth, where the frame header of the fourth microwave frame indicates that a next frame is a normal frame, and that the symbol rate of the next frame is the symbol rate corresponding to the target channel bandwidth, and the payload portion of the fourth microwave frame carries a service symbol, so as to switch the channel bandwidth. In addition to the ACM switching, the embodiment of the present invention provides an adaptive channel bandwidth switching method. When a same analog-to-digital sampling rate is adopted, the smaller the channel bandwidth, the larger a signal-to-noise ratio will be, and the higher link availability will be, thereby providing an effective method for improving link availability.

BRIEF DESCRIPTION OF THE DRAWINGS

FIG. 1A and FIG. 1B are a flowchart of an adaptive channel bandwidth switching method according to an embodiment of the present invention.

DETAILED DESCRIPTION

To make the objectives, technical solutions, and advantages of the present invention more comprehensible, the following further describes the present invention in detail with reference to the accompanying drawings and embodiments. It should be understood that the specific embodiments described herein are merely used for describing the present invention, but are not intended to limit the present invention.

In order to describe the technical solution of the present invention, specific embodiments are used to make description.

First Embodiment

Figure 1A:
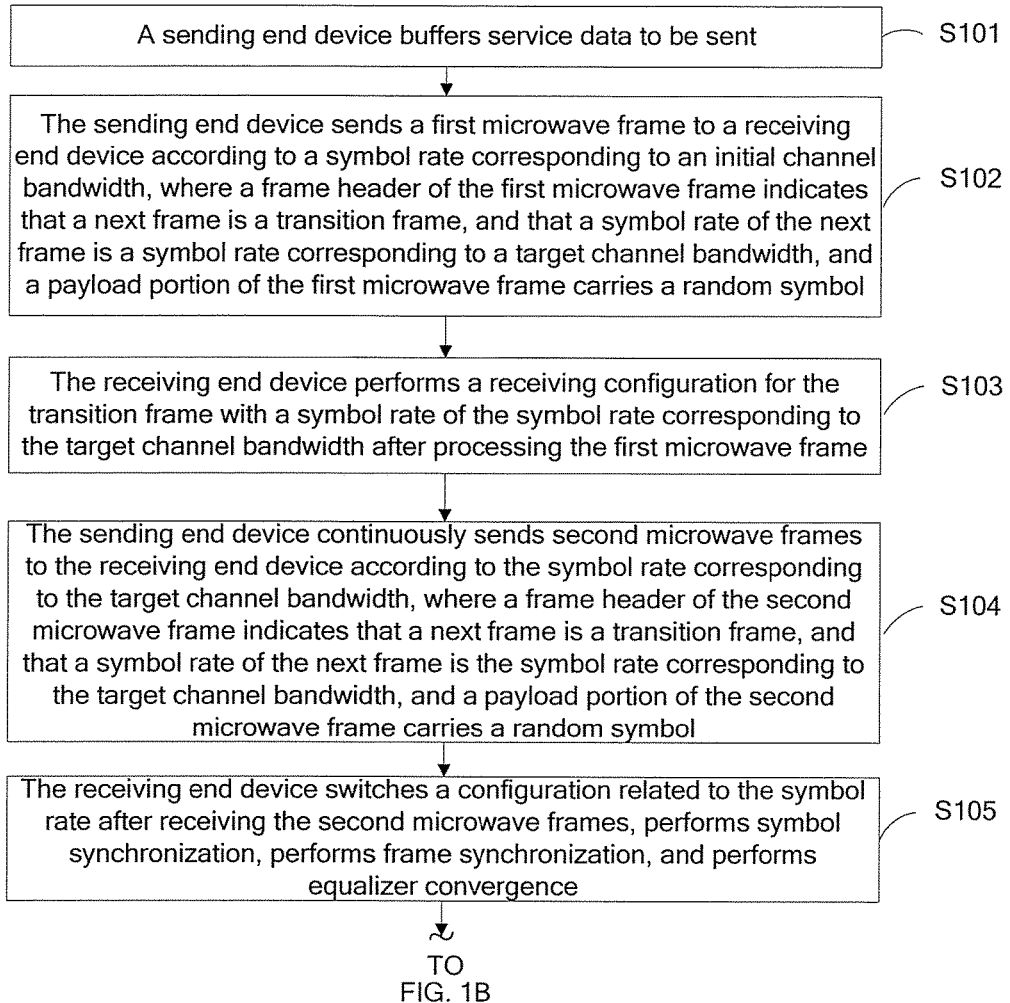

FIG. 1A and FIG. 1B shows an adaptive channel bandwidth switching method according to a first embodiment of the present invention. The method of this embodiment includes the following steps.

Step S101: A sending end device buffers service data to be sent.

The service data may be Ethernet service data or other microwave service data. In this embodiment, the service data to be sent is buffered to enable the receiving end device to completely receive and process the service data and prevent the data from losing, so as to realize lossless channel bandwidth switching.

Step S102: The sending end device sends a first microwave frame to a receiving end device according to a symbol rate corresponding to an initial channel bandwidth, where a frame header of the first microwave frame indicates that a next frame is a transition frame, and that a symbol rate of the next frame is a symbol rate corresponding to a target channel bandwidth, and a payload portion of the first microwave frame carries a random symbol.

In this embodiment, there are two types of microwave frames, which respectively are a normal frame and a transition frame, where the normal frame is used to transmit the service data, and the transition frame is used by the receiving end device to perform operations of symbol synchronization and frame synchronization during the channel bandwidth switching. The first microwave frame in this embodiment is the transition frame, and the payload portion of the first microwave frame carries the random symbol.

The normal frame and transition frame in this embodiment adopt a same microwave frame structure. As shown in Table 1, the structure includes a preamble, an AMAC (Adaptive Modulation and Adaptive Channel bandwidth, adaptive modulation and channel bandwidth) header field, a Plt (Pilot, pilot) field and a Pld (Payload, payload) field. The preamble is a fixed sequence with a length of 32 symbols, and is used to identify a frame header of a radio frame. A length of the AMAC header field is 16 symbols, and information carried in the AMAC header of a normal frame is used to identify a different symbol rate. Information carried in the AMAC header of a transition frame denotes a transition frame switching from an original symbol rate and modulation mode to a target symbol rate. The Plt field is a pilot symbol with a length of a single symbol, and is used to correct frequency offset and prevent phase noise and phase transition. The Pld field is a payload field, and is service data in a normal frame or a random symbol in a transition frame.

TABLE 1

| Preamble | AMAC header | Plt | Pld | ... | Plt | Pld |
| --- | --- | --- | --- | --- | --- | --- |

For the purpose of reducing channel bandwidth switching time, the frame length of the transition frame may be shorter than that of the normal frame. For example, the frame length of the transition frame may be ¼ of the frame length of the normal frame.

In this embodiment, the channel bandwidth is switched in a manner of frame-in-advance. The so-called frame-in-advance is used to give information of the next frame in advance in the current frame, so that the receiving end device prepare for switching. In this embodiment, the AMAC header field of the current frame indicates whether the next frame is a normal frame or a transition frame and the symbol rate of the next frame.

For ease of description, Index1, Index2, transition Index1, and transition Index2 are defined in this embodiment. A different Index denotes a different AMAC number carried in the AMAC header field, and is used to indicate whether the next frame is a normal frame or a transition frame and the symbol rate of the next frame. It is assumed that in this embodiment, the initial channel bandwidth is 500 M, the target channel bandwidth is 250 M, and the modulation mode, which is assumed to be a QPSK (quadrature phase shift keying, quadrature phase shift keying) modulation mode, is not changed during the process of channel bandwidth switching, and Index1 is used to denote a normal frame of the QPSK modulation mode in the symbol rate of 500 M; and Index2 is used to denote a normal frame of the QPSK modulation mode in the symbol rate of 250 M; the transition Index1 is used to denote a transition frame of the QPSK modulation mode in the symbol rate of 500 M; and transition Index2 is used to denote a transition frame of the QPSK modulation mode in the symbol rate of 250 M. The first microwave frame in this embodiment is the transition Index2 carried in the AMAC header field, and is used to denote that the next frame is the transition frame of the QPSK modulation mode in the symbol rate of 250 M.

In this embodiment, the microwave frame is generated by a service multiplexing module of the sending end device. Nevertheless, in other embodiments, the microwave frame may be generated in other manners.

In this embodiment, the step of sending the first microwave frame and the step of buffering the service data may be performed at the same time.

Step S103: The receiving end device performs a receiving configuration for the transition frame with a symbol rate of the symbol rate corresponding to the target channel bandwidth after processing the first microwave frame.

Step S104: The sending end device continuously sends second microwave frames to the receiving end device according to the symbol rate corresponding to the target channel bandwidth, where a frame header of the second microwave frame indicates that a next frame is a transition frame, and that a symbol rate of the next frame is the symbol rate corresponding to the target channel bandwidth, and a payload portion of the second microwave frame carries a random symbol.

In this embodiment, the AMAC header field of the second microwave frame carries the transition Index2, and is used to denote that the next frame is a transition frame of the QPSK modulation mode in the symbol rate of 250 M. The second microwave frame is sent continuously, and the sent number is related to the time required for the receiving end device to perform equalizer convergence.

Step S105: The receiving end device switches a configuration related to the symbol rate after receiving the second microwave frames, performs symbol synchronization, performs frame synchronization, and performs equalizer convergence.

In this embodiment, the receiving end device switches the configuration related to the symbol rate after receiving the second microwave frames, for example, setting a bandwidth of an AAF (anti-alias filter, anti-alias filter), shielding outband signal interference, and setting a carrier loop. The symbol synchronization may be performed by adopting the Gardner algorithm to extract an error and find the best sampling point. The frame synchronization may be performed by using the fixed sequence and a received signal to perform relevant calculation to find the frame header of the microwave frame. The equalizer convergence may be performed by the equalizer adaptively adjusting a signal frequency response gain according to the signal after frame synchronization, to eliminate multipath interference.

During implementation of a specific product, the configuration related to the symbol rate, symbol synchronization, frame synchronization, and equalizer convergence may be performed by adopting different manners.

The shorter the frame length of the second microwave frame, the more beneficial for the receiving end device to perform frame synchronization will be. The random symbol carried in each second microwave frame may use different random code formats, the better the randomness of the random symbol, the more beneficial for the receiving end device to perform symbol synchronization.

Step S106: The sending end device sends a third microwave frame to the receiving end device according to the symbol rate corresponding to the target channel bandwidth after the receiving end device performs the equalizer convergence, where a frame header of the third microwave frame indicates that a next frame is a normal frame, and that a symbol rate of the next frame is the symbol rate corresponding to the target channel bandwidth, and a payload portion of the third microwave frame carries a random symbol.

In this embodiment, the sending end device sends the third microwave frame to the receiving end device according to the symbol rate corresponding to the target channel bandwidth after the number of the sent second microwave frames reaches a preset value. That is, the sending end device controls the number of the sent second microwave frames according to the number of frames required in step S106. Generally, based on the number of frames required in step S106, the sending end device may increase a certain margin to enable the receiving end device to complete the process of step S106.

In another embodiment, whether the receiving end device performs the equalizer convergence may be judged in another manner. For example, a timer may be set when the first second microwave frame is set, and the third microwave frame is sent to the receiving end device according to the symbol rate corresponding to the target channel bandwidth when the timer expires.

In this embodiment, the AMAC header field of the third microwave frame carries Index2, to denote that the next frame is a normal frame of the QPSK modulation mode in the symbol rate of 250 M.

Step S107: The receiving end device performs a receiving configuration for the normal frame with a symbol rate of the symbol rate corresponding to the target channel bandwidth after processing the third microwave frame.

Step S108: The sending end device stops buffering the service data to be sent.

Step S109: The sending end device sends a fourth microwave frame to the receiving end device according to the symbol rate corresponding to the target channel bandwidth, where a frame header of the fourth microwave frame indicates that a next frame is a normal frame, and that a symbol rate of the next frame is a symbol rate corresponding to a target channel bandwidth, and a payload portion of the fourth microwave frame carries a service symbol, so as to switch the channel bandwidth.

In this embodiment, the AMAC header field of the fourth microwave frame carries Index2, to denote that the next frame is a normal frame of the QPSK modulation mode in the symbol rate of 250 M.

In addition, in this embodiment, before step S101 that the sending end device buffers the service data to be sent, the method may further include the following steps.

The sending end device sends a fifth microwave frame to the receiving end device according to the symbol rate corresponding to the initial channel bandwidth, where a frame header of the fifth microwave frame indicates that a next frame is a transition frame, and that a symbol rate of the next frame is the symbol rate corresponding to the initial channel bandwidth, a payload portion of the fifth microwave frame carries a service symbol. In this embodiment, the AMAC header field of the fifth microwave frame carries the transition Index1, to denote that the next frame is a transition frame of the QPSK modulation mode in the symbol rate of 500 M.

After processing the fifth microwave frame, the receiving end device performs a receiving configuration for the transition frame with a symbol rate of the symbol rate corresponding to the initial channel bandwidth.

Before the sending end device sends the fifth microwave frame, the method may further include the following steps.

An intermediate frequency module of the sending end device receives signal quality information from the receiving end device, and forwards the signal quality information to a service multiplexing module of the sending end device.

The service multiplexing module of the sending end device sends the signal quality information to an adaptive modulation mode and channel bandwidth sending module of the sending end device.

The adaptive modulation mode and channel bandwidth sending module of the sending end device judges according to the signal quality information whether it is necessary to perform channel bandwidth switching, and if yes, sends a switching request to the service multiplexing module of the sending end device.

Before the intermediate frequency module of the sending end device receives the signal quality information from the receiving end device, the method may further include the following steps.

An intermediate frequency module of the receiving end device feeds back the signal quality information to an adaptive modulation mode and channel bandwidth receiving module of the receiving end device.

The adaptive modulation mode and channel bandwidth receiving module of the receiving end device instructs a service multiplexing module of the receiving end device to send the signal quality information to the sending end device.

During the process of channel bandwidth switching, the time of symbol synchronization and frame synchronization of the receiving end device is the main time of channel bandwidth switching. It is calculated that, service interruption caused by the switching has a very small impact on the service.

It is calculated that a signal-to-noise ratio is improved by 3 dB in a same analog-to-digital sampling rate when the symbol rate corresponding to 500 M is switched to the symbol rate of 250 M, and so the link availability can be effectively improved.

In addition to the ACM switching, the embodiment of the present invention provides an adaptive channel bandwidth switching method. When a same analog-to-digital sampling rate is adopted, the smaller the channel bandwidth, the larger a signal-to-noise ratio will be, and the higher the link availability will be, thereby providing an effective method for improving link availability.

Figure 2:
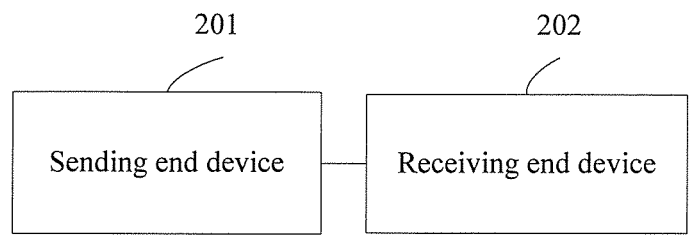
FIG. 2 is a structural diagram of an adaptive channel bandwidth switching system according to an embodiment of the present invention.

FIG. 2 shows an adaptive channel bandwidth switching system according to the first embodiment of the present invention. The system includes a sending end device 201 and a receiving end device 202.

The sending end device 201 is configured to buffer service data to be sent; send a first microwave frame to a receiving end device according to a symbol rate corresponding to an initial channel bandwidth, where a frame header of the first microwave frame indicates that a next frame is a transition frame, and that a symbol rate of the next frame is a symbol rate corresponding to a target channel bandwidth, and a payload portion of the first microwave frame carries a random symbol; continuously send second microwave frames to the receiving end device according to the symbol rate corresponding to the target channel bandwidth, where a frame header of the second microwave frame indicates that a next frame is a transition frame, and that a symbol rate of the next frame is the symbol rate corresponding to the target channel bandwidth, and a payload portion of the second microwave frame carries a random symbol; send a third microwave frame to the receiving end device according to the symbol rate corresponding to the target channel bandwidth after the receiving end device performs equalizer convergence, where a frame header of the third microwave frame indicates that a next frame is a normal frame, and that a symbol rate of the next frame is a symbol rate corresponding to a target channel bandwidth, and a payload portion of the third microwave frame carries a random symbol; stop buffer the service data to be sent; and send a fourth microwave frame to the receiving end device according to the symbol rate corresponding to the target channel bandwidth, where a frame header of the fourth microwave frame indicates that a next frame is a normal frame, and that a symbol rate of the next frame is a symbol rate corresponding to a target channel bandwidth, and a payload portion of the fourth microwave frame carries a service symbol.

The receiving end device 202 is configured to perform a receiving configuration for the transition frame with a symbol rate of the symbol rate corresponding to the target channel bandwidth after processing the first microwave frame; switch a configuration related to the symbol rate after receiving the second microwave frames, perform symbol synchronization, perform frame synchronization, and perform equalizer convergence; and perform a receiving configuration for the normal frame with a symbol rate of the symbol rate corresponding to the target channel bandwidth after the third microwave frame is processed.

In addition, the sending end device 201 is further configured to, before the service data to be sent is buffered, send a fifth microwave frame to the receiving end device according to the symbol rate corresponding to the initial channel bandwidth, where a frame header of the fifth microwave frame indicates that a next frame is a transition frame, and that a symbol rate of the next frame is the symbol rate corresponding to the initial channel bandwidth, and a payload portion of the fifth microwave frame carries a service symbol.

The receiving end device 202 is further configured to perform a receiving configuration for the transition frame with a symbol rate of the symbol rate corresponding to the initial channel bandwidth after processing the fifth microwave frame.

The sending end device 201 is further configured to, before the fifth microwave frame is sent, receive signal quality information from the receiving end device, and judge according to the signal quality information whether it is necessary to perform channel bandwidth switching.

The structure of the microwave frame in the foresaid method embodiment may be adopted for the structure of the microwave frame in this embodiment.

In addition to the ACM switching, the embodiment of the present invention provides an adaptive channel bandwidth switching system. When a same analog-to-digital sampling rate is adopted, the smaller the channel bandwidth, the larger a signal-to-noise ratio will be, and the higher link availability will be, thereby providing an effective system for improving the link availability.

A person of ordinary skill in the art may understand that all or a part of the steps of the methods in the foregoing embodiments may be implemented by a program instructing relevant hardware. The program may be stored in a computer readable storage medium, such as an ROM/RAM, a magnetic disk, or an optical disc.

The foregoing descriptions are merely exemplary embodiments of the present invention, but are not intended to limit the present invention. Any modifications, equivalent replacements, and improvements made within the spirit and principle of the present invention shall fall within the protection scope of the present invention.

What is claimed is:

1. An adaptive channel bandwidth switching method, comprising:
    buffering, by a sending end device, service data to be sent;
    sending, by the sending end device, a first microwave frame to a receiving end device according to a symbol rate corresponding to an initial channel bandwidth, wherein a frame header of the first microwave frame indicates that a next frame is a transition frame, and that a symbol rate of the next frame is a symbol rate corresponding to a target channel bandwidth, and a payload portion of the first microwave frame carries a random symbol;
    performing, by the receiving end device, a receiving configuration for the transition frame with a symbol rate of the symbol rate corresponding to the target channel bandwidth after processing the first microwave frame;
    continuously sending, by the sending end device, second microwave frames to the receiving end device according to the symbol rate corresponding to the target channel bandwidth, wherein a frame header of the second microwave frame indicates that a next frame is a transition frame, and that a symbol rate of the next frame is the symbol rate corresponding to the target channel bandwidth, and a payload portion of the second microwave frame carries a random symbol;
    switching, by the receiving end device, a configuration related to the symbol rate after receiving the second microwave frames;
    performing, by the receiving end device, symbol synchronization;
    performing, by the receiving end device, frame synchronization;
    performing, by the receiving end device, equalizer convergence;
    sending, by the sending end device, a third microwave frame to the receiving end device according to the symbol rate corresponding to the target channel bandwidth after the receiving end device performs the equalizer convergence, wherein a frame header of the third microwave frame indicates that a next frame is a normal frame, and that a symbol rate of the next frame is the symbol rate corresponding to the target channel bandwidth, and a payload portion of the third microwave frame carries a random symbol;
    performing, by the receiving end device, a receiving configuration for the normal frame with a symbol rate of the symbol rate corresponding to the target channel bandwidth after processing the third microwave frame;
    stopping buffering, by the sending end device, the service data to be sent; and
    sending, by the sending end device, a fourth microwave frame to the receiving end device according to the symbol rate corresponding to the target channel bandwidth, wherein a frame header of the fourth microwave frame indicates that a next frame is a normal frame, and that a symbol rate of the next frame is the symbol rate corresponding to the target channel bandwidth, and a payload portion of the fourth microwave frame carries a service symbol, so as to switch the channel bandwidth.

2. The method according to claim 1, wherein before buffering, by the sending end device, service data to be sent, the method further comprises:
    sending, by the sending end device, a fifth microwave frame to the receiving end device according to the symbol rate corresponding to the initial channel bandwidth, wherein a frame header of the fifth microwave frame indicates that a next frame is a transition frame, and that a symbol rate of the next frame is the symbol rate corresponding to the initial channel bandwidth, and a payload portion of the fifth microwave frame carries a service symbol; and
    performing, by the receiving end device, a receiving configuration for the transition frame with a symbol rate of the symbol rate corresponding to the initial channel bandwidth after processing the fifth microwave frame.

3. The method according to claim 2, wherein before sending, by the sending end device, a fifth microwave frame, the method further comprises:
    receiving, by an intermediate frequency module of the sending end device, signal quality information from the receiving end device, and forwarding the signal quality information to a service multiplexing module of the sending end device;
    sending, by the service multiplexing module of the sending end device, the signal quality information to an adaptive modulation mode and channel bandwidth sending module of the sending end device; and
    judging according to the signal quality information, by the adaptive modulation mode and channel bandwidth sending module of the sending end device, whether it is necessary to perform channel bandwidth switching, and if yes, sending a switching request to the service multiplexing module of the sending end device.

4. The method according to claim 3, wherein before receiving, by the intermediate frequency module of the sending end device, signal quality information from the receiving end device, the method further comprises:
    feeding back, by an intermediate frequency module of the receiving end device, the signal quality information to an adaptive modulation mode and channel bandwidth receiving module of the receiving end device; and
    instructing, by the adaptive modulation mode and channel bandwidth receiving module of the receiving end device, a service multiplexing module of the receiving end device to send the signal quality information to the sending end device.

5. The method according to claim 1, wherein sending, by the sending end device, a third microwave frame to the receiving end device according to the symbol rate corresponding to the target channel bandwidth after the receiving end device performs the equalizer convergence comprises:
    sending, by the sending end device, a third microwave frame to the receiving end device according to the symbol rate corresponding to the target channel bandwidth after the number of the sent second microwave frames reaches a preset value; or
    setting, by the sending end device, a timer, and sending a third microwave frame to the receiving end device according to the symbol rate corresponding to the target channel bandwidth when the timer expires.

6. An adaptive channel bandwidth switching system, comprising:

a sending end device and a receiving end device;

wherein the sending end device is configured to buffer service data to be sent; send a first microwave frame to a receiving end device according to a symbol rate corresponding to an initial channel bandwidth, wherein a frame header of the first microwave frame indicates that a next frame is a transition frame, and that a symbol rate of the next frame is a symbol rate corresponding to a target channel bandwidth, and a payload portion of the first microwave frame carries a random symbol; continuously send second microwave frames to the receiving end device according to the symbol rate corresponding to the target channel bandwidth, wherein a frame header of the second microwave frame indicates that a next frame is a transition frame, and that a symbol rate of the next frame is the symbol rate corresponding to the target channel bandwidth, and a payload portion of the second microwave frame carries a random symbol; send a third microwave frame to the receiving end device according to the symbol rate corresponding to the target channel bandwidth after the receiving end device performs equalizer convergence, wherein a frame header of the third microwave frame indicates that a next frame is a normal frame, and that a symbol rate of the next frame is the symbol rate corresponding to the target channel bandwidth, and a payload portion of the third microwave frame carries a random symbol; stop buffer the service data to be sent; and send a fourth microwave frame to the receiving end device according to the symbol rate corresponding to the target channel bandwidth, wherein a frame header of the fourth microwave frame indicates that a next frame is a normal frame, and that a symbol rate of the next frame is the symbol rate corresponding to the target channel bandwidth, and a payload portion of the fourth microwave frame carries a service symbol; and the receiving end device is configured to perform a receiving configuration for the transition frame with a symbol rate of the symbol rate corresponding to the target channel bandwidth after processing the first microwave frame; switch a configuration related to the symbol rate after receiving the second microwave frames, perform symbol synchronization, perform frame synchronization, and perform equalizer convergence; and perform a receiving configuration for the normal frame with a symbol rate of the symbol rate corresponding to the target channel bandwidth after the third microwave frame is processed.

7. The system according to claim 6, wherein:

the sending end device is further configured to, before the service data to be sent is buffered, send a fifth microwave frame to the receiving end device according to the symbol rate corresponding to the initial channel bandwidth, wherein a frame header of the fifth microwave frame indicates that a next frame is a transition frame, and that a symbol rate of the next frame is the symbol rate corresponding to the initial channel bandwidth, and a payload portion of the fifth microwave frame carries a service symbol; and the receiving end device is further configured to perform a receiving configuration for the transition frame with a symbol rate of the symbol rate corresponding to the initial channel bandwidth after processing the fifth microwave frame.

8. The system according to claim 7, wherein:

the sending end device is further configured to, before the fifth microwave frame is sent, receive signal quality information from the receiving end device, and judge according to the signal quality information whether it is necessary to perform channel bandwidth switching.

* * * * *